United States Patent

Allen et al.

[15] 3,640,773
[45] Feb. 8, 1972

[54] METHOD OF OPERATING FUEL CELL AND PREVENTING CORROSION

[72] Inventors: Robert J. Allen, Saugus; Robert Lee Novack, Hanover, both of Mass.

[73] Assignee: Prototech Company, Division of Bolt Beranek and Newman Inc., Cambridge, Mass.

[22] Filed: May 16, 1967

[21] Appl. No.: 638,937

[52] U.S. Cl. ........................................................136/86
[51] Int. Cl. ...............................H01m 21/06, H01m 27/22
[58] Field of Search ........................................136/86

[56] References Cited

UNITED STATES PATENTS

| | | |
|---|---|---|
| 2,997,517 | 8/1961 | Ciarlariello ........................136/86 |
| 3,026,364 | 3/1962 | Jackson et al. ....................136/86 |
| 3,183,122 | 5/1965 | White et al. ......................136/86 |
| 3,206,333 | 9/1965 | Ehrenfeld .........................136/86 |
| 3,309,229 | 3/1967 | Delfino ............................136/86 |
| 3,343,989 | 9/1967 | Hasbrouck et al. ................136/86 |
| 3,418,169 | 12/1968 | Matsen et al. ...................136/86 X |

Primary Examiner—Allen B. Curtis
Attorney—Rines and Rines

[57] ABSTRACT

The present invention relates in an important aspect to the prevention of electrolyte creeping out of fuel and/or oxidant inlets and the like in closed fuel cell housings, through the use of high temperature substantially nonwetting plugs disposed at appropriate locations along the inlets.

3 Claims, 1 Drawing Figure

PATENTED FEB 8 1972
3,640,773
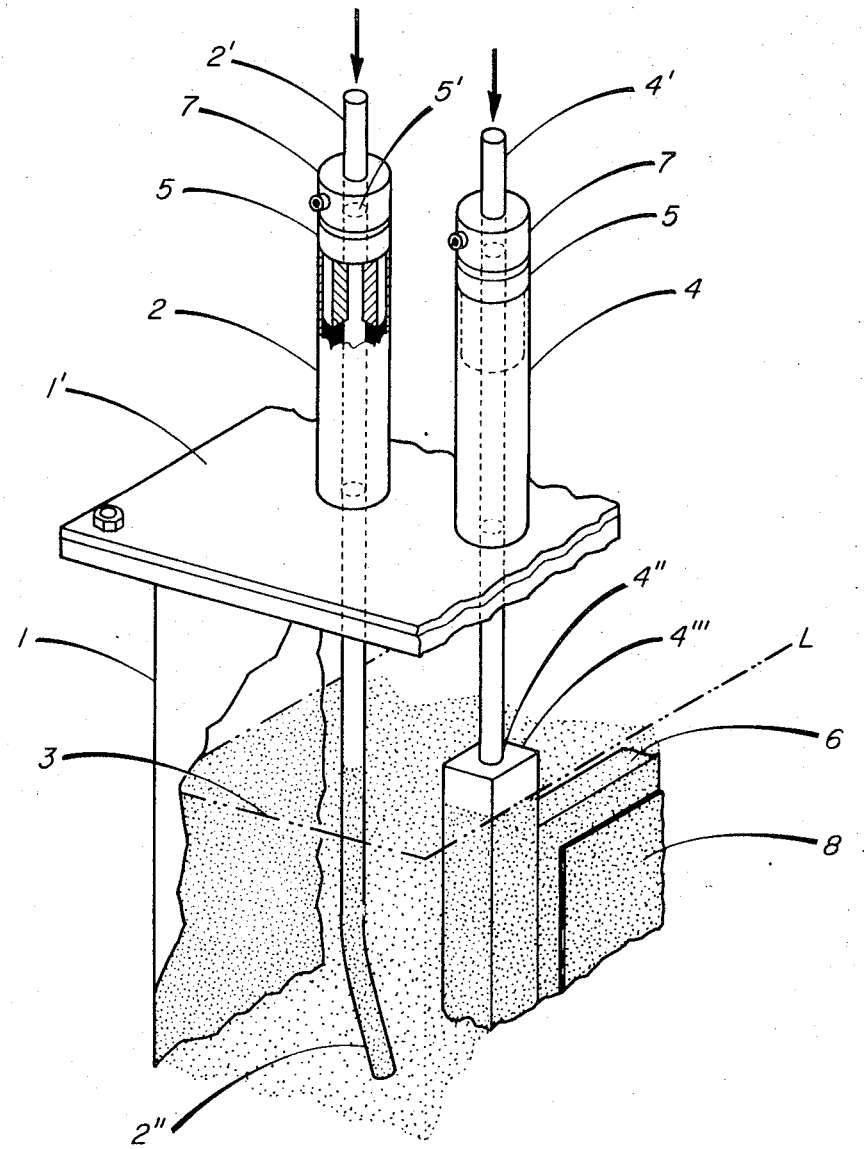
ROBERT J. ALLEN
ROBERT LEE NOVACK, INVENTORS
BY *Kurce and Kines*
ATTORNEYS

METHOD OF OPERATING FUEL CELL AND PREVENTING CORROSION

This application relates to methods concerned with fuel cell structures and the like and more particularly concerned with fuel and/or oxidant inlet structures communicating with closed fuel cell housings and to novel subcombination structures that are of more general utility, also.

One of the problems that has been encountered in operating closed fuel cell housings particularly embodying relatively high-temperature molten electrolytes and the like, such as, for example, the molten hydroxide electrolytic media described in copending application of the applicant Robert L. Novack et al., Ser. No. 376,916, "Fuel Cell Apparatus and Method," abandoned for Ser. No. 677,478, now U.S. Pat. No. 3,471,335 resides in the tendency for highly corrosive electrolytic media to wet the inner wall surfaces of the fuel and oxidant inlets communicating with the cell housing and to creep upward along the inner walls of the inlets through the action of surface tension, ultimately congealing upon the cooler regions thereof. In addition to the plugging and corrosive effects of this phenomenon, the congealed electrolyte acts as a porous sponge for increasing the rate of creep, thus limiting the life and useful operation of the cell.

In accordance with the discovery underlying the present invention, this problem can be well obviated, in summary, by using appropriate high-temperature, substantially nonwetting apertured plugs at appropriate cooler regions of the inlets. An object of the invention, accordingly, is to provide a solution to this creeping problem through the technique broadly summarized above.

A further object is to provide a new and improved fuel cell structure.

Still an additional object is to provide a novel subcombination structure for preventing accelerated corrosive effects at the anode region of the fuel cell that, while particularly advantageous in connection with the solution of the creeping problem above mentioned, is also useful in and of itself.

Other and further objects will be hereinafter pointed out and more specifically delineated in the appended claims.

The invention will be described in connection with the accompanying drawing, the single FIGURE of which is a fragmentary isometric view illustrating the invention in preferred form.

Referring to the drawing, a closed fuel cell housing as of nickel or the like is shown at 1, containing, for example, the before-mentioned molten hydroxide electrolytic medium 3, an oxidant conduit inlet 2 and fuel conduit inlet 4. Other conventional details, such as vents, temperature-providing auxiliary apparatus, electrical terminals and the like are omitted so as not to detract from the features of novelty of the invention. Each inlet is shown of substantially hollow tubular construction, mechanically supported by the top wall 1' of the housing 1, and if of metal, the inlets may be electrically connected to the housing and thus maintained at the potential thereof. The inlets like the housing may be also, for example, constructed of nickel. The electrolytic medium 3 may, as an illustration, be a combination of molten potassium and sodium hydroxide maintained at a high temperature of the order of about 400° C., as explained in the said copending application; and the inlet 2 may introduce air oxidant for stirring action in connection with the superoxide or peroxide operation of the cell (the nickel housing walls serving as a cathode) and with fuel supplied, for example, by the inlet 4 into a support 6 carrying on opposite faces thereof thin palladium-containing hydrogen permeable but otherwise impervious layers (of which the right-hand layer 8 only is shown). The air is introduced in the direction of the left-hand arrow through a pipe 2' of cross section smaller than the inlet 2 and which extends, as shown at 2'', into the cathodic region of the electrolytic medium 3; whereas the fuel may be introduced, in the direction of the right-hand arrow, through a similar pipe 4' which communicates at 4'' with a post or other inlet means 4''' of greater cross section and extending upward from and connected with the support 6 to communicate the gaseous input at 4' within the support 6 between the right-hand sealed anode layer 8 and the opposing parallel left-hand layer (not shown). If desired, the fuel introduced at 4' may be pure or impure hydrogen; or it may constitute a hydrogen and carbon-containing fuel that is reformed in situ within the support 6 in the space between the right-hand anode layer 8 and the left-hand layer (not shown), as further described in said copending application and in U.S. Letters Pat. No. 3,206,334.

In accordance with the present invention, the serious problem during high-temperature operation of the creeping of the electrolytic medium 3 upward along the inner walls of the inlets 2 and 4 under the action of surface-tension resulting from the wetting of the inner nickel or other walls by the molten electrolyte, has been found to be completely obviated by the insertion of a preferably T-shaped plastic plug 5, centrally apertured at 5' to receive the feedpipe 2' and critically constituted of a high-temperature plastic material substantially nonwetting to the electrolytic medium, as later discussed. The walls of the plug 5 are contiguous with and maintained closely against the inner walls of the inlet 2 at its upper region or cooler end, displaced from the hotter top wall 1' of the housing 1.

Whereas such an end region would within a few hours of operation normally be found to be corrosively coated with congealed electrolytic medium in the absence of the invention, operation without the slightest signs of electrolytic medium creep or corrosion or accumulation over thousands of hours has been obtained with the molten alkali hydroxide media above-discussed. Suitable high-temperature plastic materials that have been discovered to have the necessary substantially nonwetting characteristic for such molten hydroxide electrolytic media and the like include polymeric fluorinated hydrocarbon plastic materials such as those marketed under the trademark "Teflon."

To aid in adjusting the degree of insertion of the pipe 2' and 4'—4''' within the housing 1 and the electrolytic medium 3 contained therein, metal collars, such as aluminum locking nuts 7, are shown provided above and in contact with the upper surfaces of the plugs 5.

In accordance with a further preferred operational discovery underlying the invention, destructive corrosive attack of the relatively small corrosion-dimensioned feedpipe 4' can be overcome by connecting the same as at 4'' to a larger and more sturdy cross-sectional inlet supporting structure 4''' and by insuring the positioning of the anode structure 6–8 to a degree such that the upper level of the electrolytic medium represented by the dash-dot line L touches the larger inlet support posts 4''' but does not contact the finer inlet pipe 4'. The latter, to the contrary, extends through the airspace near the top of the housing 1 through the inlet 4, its plug 5, and locking collar 7.

In connection with the anode structure, the insulating properties of the plastic materials before-referenced fortuitously serve also adequately to isolate electrically the anode structure 4'—4'''–6–8 from the cathode structure of the housing 1 and the integrally connected inlet 4.

Further modifications will occur to those skilled in this art and all such are considered to fall within the spirit and the scope of the invention as defined in the appended claims.

What is claimed is:

1. A method of operating a fuel cell having a closed housing with fuel and oxidant and tubular inlets extending outwardly from a wall of the housing and communicating through the wall with a molten alkali hydroxide electrolytic medium corrosive to metals and maintained at a temperature of the order of at least 400° C., and of preventing corrosion or plugging of the inlets and corrosion of fuel and oxidant gas metal feedpipes extending into the housing through the inlets, said method comprising interposing a tubular plug of high temperature, noncorroding plastic material, nonwetting to said medium, between the outer surface of each gas feedpipe and the inner surface of the associated inlet and in contact with the said surfaces at regions thereof spaced from the said wall of the housing and substantially cooler than the medium, providing an anode support in the medium with a portion of substantially greater cross section than the fuel gas feedpipe extending substantially above the level of the medium in the housing, securing the end of the fuel gas feedpipe within the housing to said anode support portion at a location substantially above said level of the medium, supplying oxidant gas to the oxidant gas feedpipe and fuel gas containing hydrogen to the fuel gas feedpipe, and providing said anode support with a layer selectively permeable to hydrogen and with one side of the layer in contact with the electrolytic medium and the other side thereof supplied with the fuel gas.

2. A method in accordance with claim 1, and in which the plugs comprise polymeric fluorinated hydrocarbon plastic material.

3. A method in accordance with claim 1, and in which said inlet are electrically connected at cathode potential and said plugs are electrically insulative.

* * * * *